United States Patent
Tian et al.

(10) Patent No.: US 9,415,513 B2
(45) Date of Patent: Aug. 16, 2016

(54) SYSTEMS AND METHODS FOR RAILYARD ROBOTICS

(71) Applicant: General Electric Company, Schenectady, NY (US)

(72) Inventors: Tai-Peng Tian, Niskayuna, NY (US); Charles Burton Theurer, Niskayuna, NY (US); Balajee Kannan, Niskayuna, NY (US); Huan Tan, Niskayuna, NY (US); Arpit Jain, Niskayuna, NY (US); Guiju Song, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/473,241

(22) Filed: Aug. 29, 2014

(65) Prior Publication Data

US 2016/0059416 A1    Mar. 3, 2016

(51) Int. Cl.
| | | |
|---|---|---|
| G06F 19/00 | (2011.01) | |
| B25J 9/16 | (2006.01) | |
| B25J 5/02 | (2006.01) | |

(52) U.S. Cl.
CPC ........ *B25J 9/1666* (2013.01); *B25J 5/02* (2013.01); *B25J 9/1697* (2013.01); *Y10S 901/01* (2013.01); *Y10S 901/09* (2013.01)

(58) Field of Classification Search
CPC ....... B61C 17/12; G05D 1/0229; G01S 19/51
USPC ........ 700/245, 253; 701/19, 23, 28, 468, 470, 701/516, 526; 340/546, 988, 900, 992; 342/357.34
See application file for complete search history.

(56) References Cited

U.S. PATENT DOCUMENTS

| | | | |
|---|---|---|---|
| 5,429,329 A | 7/1995 | Wallace et al. | |
| 7,167,095 B2 | 1/2007 | Carrender | |
| 7,321,305 B2 | 1/2008 | Gollu | |
| 2005/0107954 A1* | 5/2005 | Nahla | B61L 25/021 701/301 |
| 2007/0291985 A1 | 12/2007 | Krahnstoever et al. | |
| 2012/0274772 A1* | 11/2012 | Fosburgh | B61K 9/08 348/149 |
| 2014/0067188 A1 | 3/2014 | Mian | |
| 2014/0142868 A1* | 5/2014 | Bidaud | G01N 21/8803 702/40 |

FOREIGN PATENT DOCUMENTS

| | | |
|---|---|---|
| WO | 2008017821 A2 | 2/2008 |
| WO | 2009105211 A2 | 8/2009 |

OTHER PUBLICATIONS

Mobile Detection Assessment and Response System (MDARS); http://www.globalsecurity.org/military/systems/ground/mdars.htm.
Sameshima et al.; K-tavo: a robotic behavior management module to urge a human to avoid; Proceedings of the 39nd ISR; Oct. 2008; p. 1-6.
Wang; Obstacle Avoidance Algorithms and Sensors for Autonomous Robots; ECE 4007 L03 Koblasz and Maxwell; p. 3.

* cited by examiner

*Primary Examiner* — McDieunel Marc
(74) *Attorney, Agent, or Firm* — John P. Darling (57) ABSTRACT

A robot in one embodiment includes a navigation system, a manipulation unit, a visual recognition unit, and a processing unit. The visual recognition unit includes at least one detector configured to acquire presence information of humans within at least a portion of the area. The processing unit is operably coupled to the navigation system, manipulation unit, and visual recognition unit, and is configured to determine a presence of a human within at least one predetermined range of the robot using the presence information from the visual recognition unit, determine at least one control action responsive to determining the presence of the human within the at least one predetermined range, and control at least one of the navigation system or manipulation unit to implement the at least one control action.

20 Claims, 4 Drawing Sheets

SYSTEMS AND METHODS FOR RAILYARD ROBOTICS

BACKGROUND

A variety of tasks may be performed in a rail yard on one or more rail vehicle systems within the yard. For example, between missions performed by a rail vehicle, various systems, such as braking systems, of the units of a rail vehicle may be inspected and/or tested. In a rail yard, there may be a large number of rail cars in a relatively confined area, resulting in a large number of inspection and/or maintenance tasks. Difficult, dangerous, and/or mundane or repetitive tasks may be performed by robots.

However, there may still be tasks that are inappropriate for performance by a robot, resulting in humans being in the rail yard while the robots are performing tasks. Further, humans may be in the rail yard to oversee the robots or for other purposes, resulting in the potential for inadvertent, inconvenient, and/or dangerous incidents or contact between robots and humans, for example if a human is disposed on a path about to be traversed by a robot.

BRIEF DESCRIPTION

In one embodiment, a robot (e.g., a robot for use in a rail yard) is provided including a navigation system, a manipulation unit, a visual recognition unit, and a processing unit. The navigation system is configured to move the robot about an area. The manipulation unit is configured to at least one of grasp items or provide an adjustable view for collection of information. The visual recognition unit includes at least one detector configured to acquire presence information of humans within at least a portion of the area. The processing unit is operably coupled to the navigation system, manipulation unit, and visual recognition unit, and is configured to determine a presence of a human within at least one predetermined range of the robot using the presence information from the visual recognition unit, determine at least one control action responsive to determining the presence of the human within the at least one predetermined range, and control at least one of the navigation system or manipulation unit to implement the at least one control action.

In another embodiment, a method for controlling one or more rail yard robots is provided. The method includes obtaining presence information of humans within at least a portion of the area using a visual recognition unit. The method also includes determining a presence of a human within at least one predetermined range of the robot using the presence information. Further, the method includes determining at least one control action for the robot responsive to the determination of the presence of the human, and controlling at least one of a navigation system or manipulation unit of the robot using the at least one control action.

In another embodiment, a tangible and non-transitory computer readable medium is provided. The tangible and non-transitory computer readable medium includes one or more computer software modules. The one or more computer software modules are configured to direct one or more processors to obtain presence information within at least a portion of a rail yard area using a visual recognition unit. The one or more computer software modules are also configured to direct the one or more processors to determine a presence of a human within at least one predetermined range of a rail yard robot using the presence information. Also, the one or more computer software modules are configured to direct the one or more processors to determine at least one control action for the robot responsive to the determination of the presence of the human, and to control at least one of a navigation system or manipulation unit of the robot using the at least one control action.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide methods and systems for rail yard robots. For example, various embodiments provide for detection of persons within one or more ranges of a rail yard robot, and appropriate control of the rail yard robot based on the positions of one or more persons within one or more ranges of the robot. The detection of people may be performed using one or more cameras (e.g., two-dimensional camera, three-dimensional or stereo camera) or other visual detection devices (e.g., LIDAR) in conjunction with recognition software (e.g., software configured to detect the presence, distance, motion, and/or posture of one or more persons within the field of view of a camera or other detection device).

At least one technical effect of various embodiments includes improving safety for human workers working alongside robots in a rail yard. At least one technical effect of various embodiments is the reduction or elimination of worksite accidents involving robots.

Figure 1:
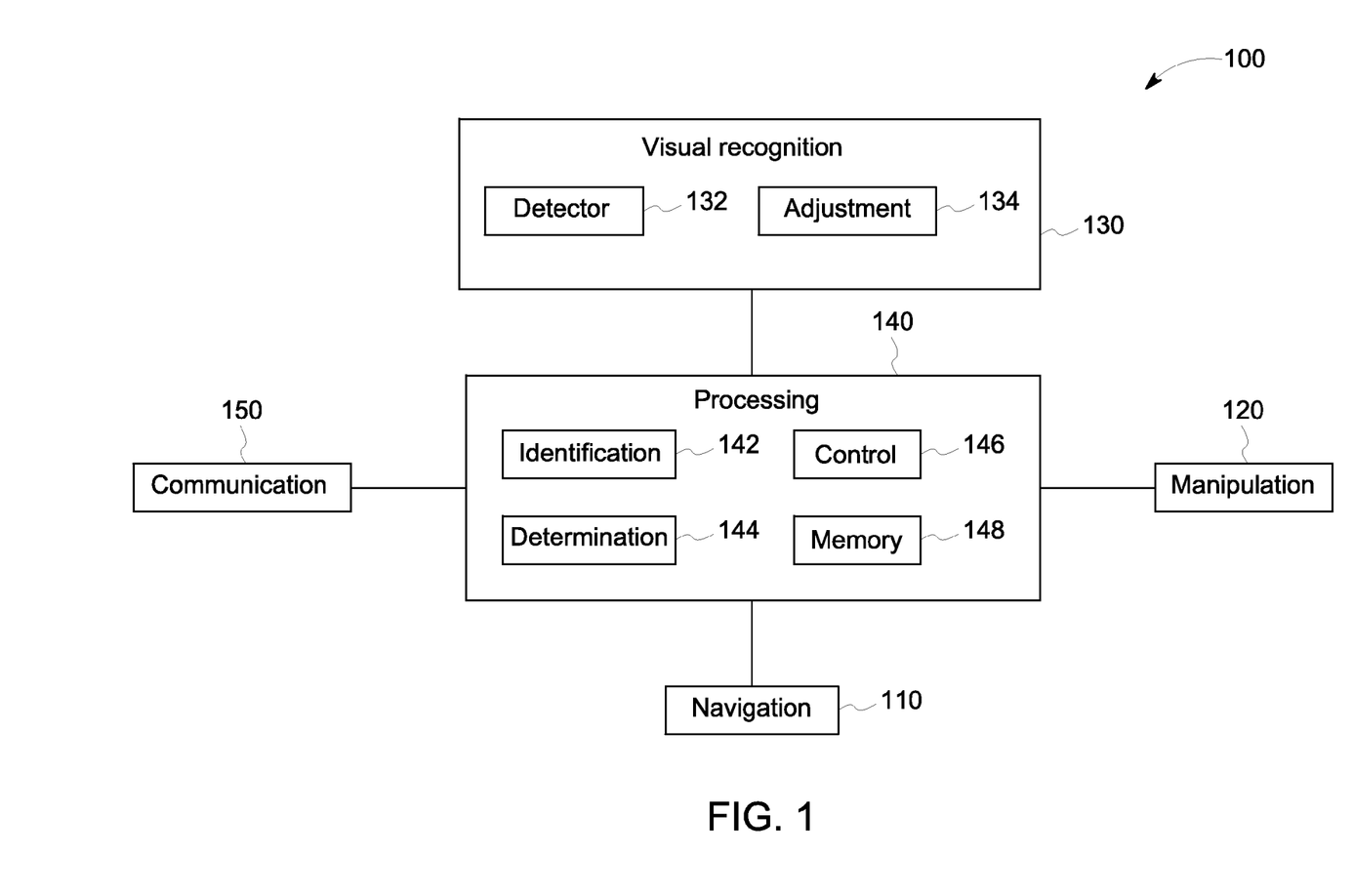
FIG. 1 is a schematic block diagram of a rail yard robot in accordance with various embodiments.

FIG. 1 is a schematic view of a robot 100 for use in rail yards in accordance with various embodiments. Generally, as used herein, a rail yard robot may be understood as a non-manned mobile device configured to perform one or more tasks autonomously and/or via remote control. The depicted robot 100 is configured to perform one or more maintenance, repair, and/or inspection tasks on rail cars in a rail yard. For example, the robot 100 may be used to provide information (e.g., visual information) regarding the underside of a rail yard car or other difficult to access area, for remote inspection (e.g., by an operator viewing a screen communicably coupled with an inspection camera of the robot 100). As another example, the robot 100 may be used to actuate brake levers, switches, couplings, or other mechanical features of a rail car and/or rail yard. As one more example, the robot 100 may be used to transport heavy and/or awkward objects to or from a rail car. It may be noted that while the example embodiments discussed herein are discussed in connection with rail yard applications, other environments may also be contemplated in alternate embodiments. For example, robots for other areas for inspection or maintenance of other types of vehicles, such as trucks or ships, may be provided in various embodiments.

The depicted robot 100 includes a navigation system 110, a manipulation unit 120, a visual recognition unit 130, a processing unit 140, and a communication unit 150. Generally, the navigation system 110 is configured to provide mobility to the robot 100, for example to move the robot 100 about an area within which the robot may perform one or more tasks. The manipulation unit 120 is configured to at least one of grasp items or provide an adjustable view for collection of information. The visual recognition unit 130 is configured to acquire presence information of humans (information from which the presence, distance, posture, and/or speed of humans may be determined) within at least a portion of the area within which the robot may perform one or more tasks. The processing unit 140 in the illustrated embodiment is disposed on-board the robot 100, and is operably coupled to the navigation system 110, the manipulation unit 120, the visual recognition unit 130, and the communication unit 150. The depicted processing unit 140 is configured to determine a presence of a human within at least one predetermined range of the robot 100 using presence information from the visual recognition unit 130 (e.g., provided by the visual recognition unit 130 to the processing unit 140 or otherwise acquired or obtained by the processing unit 140). The processing unit 140 of the illustrated embodiment is also configured to determine at least one control action for the robot 100 responsive to the determining the presence of the human within the at least one predetermined range, and to control the navigation system 110 and/or the manipulation system 120 to implement the at least one control action.

For example, a planned movement and/or performance of a task may be scheduled to be performed by the robot 100. As the robot 100 begins to perform the task or movement, a human may be detected within an operational range of the robot 100 (e.g., within a buffer zone in a direction of travel or within a range reachable by a robotic arm, among others). Responsive to the detection of the human, the task or movement may be altered. For example, the task or movement may be paused or halted until the human is no longer within the operational range, or, as another example, the task or movement may be adjusted to avoid the human. The position of the human may be monitored on a generally continuous or periodic basis to help ensure the appropriate control of the robot 100 (e.g., control of the navigation system 110 and/or the manipulation unit 120) to avoid contact with a human (or to avoid proximity within a predetermined distance of a human).

The depicted navigation system 110 is configured to provide mobility to the robot 100, for example to move the robot 100 about an area within which the robot may perform one or more tasks. The navigation system 110, for example, may include one or more motors and/or wheels for propulsion, a steering mechanism, brakes, or the like. The navigation system 110 in the illustrated embodiment receives control signals or commands from the processing unit 140 and/or a remote source to control propulsion (e.g., slowing down or speeding up), braking (e.g., slowing down or stopping), and steering of the robot 100.

Figure 2:
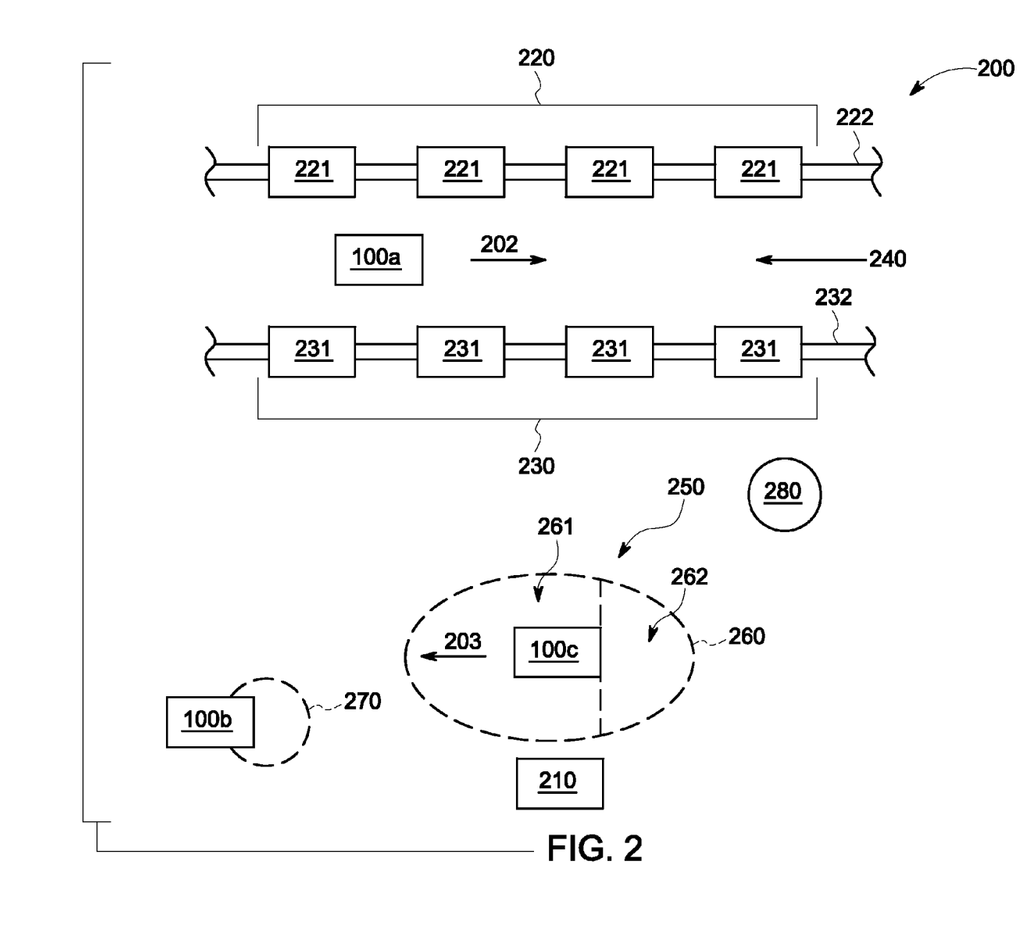
FIG. 2 is a schematic diagram of an area within which the rail yard robot of FIG. 1 may operate in accordance with various embodiments.

FIG. 2 provides an example of an area within which the robot 100 may navigate. FIG. 2 provides a schematic view of an area 200 (e.g., a rail yard or a portion thereof) within which one or more rail yard robots (e.g., robot 100) may operate in accordance with various embodiments. In the illustrated embodiment, three robots (100a, 100b, and 100c) are deployed in the area 200. The area 200 includes a narrow area 240 and an open area 250. Generally, the narrow area 240 includes one or more buildings, vehicles, or structures that form a confined area or otherwise impede freedom of movement therein. In the illustrated embodiment, the narrow area 240 is shown as a narrow passage or corridor between two rail vehicles. As seen in FIG. 2, a first rail vehicle 220 including a series of rail cars 221 is disposed on a first track 222. Also, a second rail vehicle 230 including a series of rail cars 231 is disposed on a second track 232, with the second track 232 extending generally parallel to the first track 222. For example, the narrow area 240 may be a corridor having a width between about 2.5 and 3.0 meters located between rail vehicles (e.g., first rail vehicle 220 and second rail vehicle 230) and/or tracks (e.g., first track 222 and second track 232). By way of example, in some embodiments, the narrow area 240 may have a width of less than 5 meters, less than 3 meters, or less than 2 meters (e.g., between rail tracks). In some embodiments, the narrow area 240 may be narrow enough that is impractical or impossible for two people to walk side-by-side in the narrow area. The narrow area 240 may be sized in some embodiments such that it is impractical or difficult for a human to walk around a robot 100 disposed within the narrow area 240. In some embodiments, the narrow area 240 may have a width that is less than twice a width of the robot 100, or less than three times a width of the robot 100, among others. The open area 250, on the other hand, may be located in a less confined or more open portion of the area 200. In the illustrated embodiment, a given robot may travel from base 210 through open area 250 to get to narrow area 240 where the robot may perform inspection and/or maintenance tasks, for example, on rail cars 221, 231.

Different control strategies may be employed for controlling the robots 100a, 100b, 100c depending on whether the robots are in the open area 250 or the narrow area 240. For example, a more restrictive or less permissive control strategy may be employed in the narrow area 240, and a less restrictive or more permissive control strategy may be employed in the open area 250. For instance, if robot 100a (in the narrow area 240) traveling in direction of travel 202 determines a human is within a buffer zone, the robot 100a may be controlled to stop until the human is no longer within the buffer zone. However, if robot 100c (in the open area 250) traveling in direction of travel 203 determines a human is within a buffer zone, the robot 100c may continue traveling but travel in a different path than originally planned to keep the human out of the buffer zone of robot 100c.

In the illustrated embodiment, robot 100a is travelling in direction of travel 202 in the narrow area 240, robot 100b is stationary (e.g., performing a manipulation task) in the open area 250, and robot 100c is travelling in direction of travel 203 in the open area 250. Control actions for the robots 100a, 100b, 100c may be determined based on one or more zones corresponding to operational modes (e.g., navigation mode or mobile mode where robot is moving or about to move, or manipulation mode where robot is moving a manipulation device such as an arm or about to move the manipulation device) and/or location (e.g., within open area 250 or within narrow area 240). Before commencing travel to be accomplished using a navigation system (e.g., navigation system 110) and/or a task to be performed with a manipulation unit (e.g., the manipulation unit 120), a robot may determine if a human is within a given zone, and adjust a control plan accordingly.

For example, as seen in FIG. 2, the robot 100c is traveling in the open area 250. A buffer zone may be employed when a robot is traveling or about to travel (e.g., when the robot is in navigation or mobile mode). In the illustrated embodiment, a buffer zone 260 surrounds the robot 100c. The depicted buffer zone 260 includes a first buffer zone 261 disposed laterally and forward of the robot 100c, and a second buffer zone 262 disposed behind the robot 100c (relative to the direction of travel 203). It may be noted that the buffer zone 260 is illustrated as generally uniformly disposed about the robot 100c, but may be shaped or positioned otherwise in various embodiments. For example, the buffer zone may be limited to a forward portion oriented generally toward a direction of travel (e.g., first buffer zone 261) in various embodiments, and may extend farther in the direction of travel than in lateral directions. Generally, the buffer zone is configured to provide the robot with adequate time to detect a human and avoid the human when traveling. Further, the buffer zone may be dynamically adjustable, for example to provide a larger buffer zone when traveling at higher speeds and a smaller buffer zone when traveling at lower speeds.

As another example, a first, larger buffer zone may be used when the robot is in the open area 250, and a second, smaller buffer zone may be used when the robot is in the narrow area 240. Further still, in some embodiments, multiple buffer zones may be contemporaneously employed. For example, a first, larger buffer zone may be utilized, with an auditory alarm, message, or other signal provided to warn humans detected in the larger buffer zone of the presence of the robot, and a second, smaller buffer zone may be utilized, with control of the robot altered when a human is detected in the second, smaller buffer zone. As another example, a first, larger buffer zone may be provided with a first less restrictive control action (e.g., steering to avoid human and/or slowing down) implemented when a human is detected in the first, larger buffer zone, and a second, smaller buffer zone may be provided with a more restrictive control action (e.g., stopping the robot, or slowing down by a greater amount than for the first, larger buffer zone) when a human is detected in the second, smaller buffer zone. As one more example, a warning may be provided when a human is in a first, larger buffer zone, a more restrictive control may be implemented when a human is in a second, smaller buffer zone, and a less restrictive control may be implemented when a human is in a third, intermediately sized buffer zone.

Another example of a zone for which a control action of a robot may be altered when a human is detected within the zone is a manipulation zone. The manipulation zone may be utilized, for example, when the robot is in a manipulation operational mode, or is stationary and performing (or about to perform) a task involving movement of the manipulation unit (e.g., manipulation unit 120). For example, if a human is detected within the manipulation zone, movement of the manipulation unit may be stopped until the human is outside of the manipulation zone (or a movement planned to occur may be postponed until the human is outside of the manipulation zone). As another example, if a human is detected within a specific portion of the manipulation zone, the manipulation unit may be operated to only reach other portions of the manipulation zone but not the specific portion for which a human has been detected. As with the buffer zone for navigation operation of the robot, the presence of the human may be monitored in an ongoing fashion, and the control action of the robot updated appropriately (e.g., avoid movement of manipulation arm when human is within zone, resume movement of manipulation arm when human is outside of zone). In the illustrated embodiment, a generally circular manipulation zone 270 is shown for the robot 100b. The manipulation zone 270 may have a radius corresponding to a maximum reach of a manipulation arm. The manipulation zone 270 may be sized to include all possible positions of the arm or other manipulation unit, or so that the manipulation unit may not reach beyond the manipulation zone 270. In various embodiments, the manipulation zone 270 may not be circular. For example, the manipulation zone may be configured to only cover or correspond to a current position of a manipulation unit as well as any planned positions of the manipulation unit for a task about to be performed (or being currently performed). For robots having plural manipulation units, plural corresponding manipulation zones may be defined for each manipulation unit. Further, similar to the discussion regarding the buffer zone above, warning zones and/or zones for different levels of restriction on movement may be employed for manipulation zones.

Generally, the information used by the robots to determine if a human is present within a given zone may be obtained using one or more visual recognition units (e.g., visual recognition unit 130) disposed on-board the robot. In some embodiments, information obtained on-board may be supplemented and/or replaced with information from off-board sources. For example, in the illustrated embodiment, an off-board visual recognition unit 280 (e.g., a camera or lidar detector mounted on a post or other structure) may provide information on the location of humans within a field of view of the off-board visual recognition unit 280. For example, the off-board visual recognition unit 280 may be directed to focus on all or a portion of the narrow area 240 to provide information corresponding to any humans within the narrow area 240. Alternatively or additionally, other robots may be used as off-board information sources. For example, when a robot detects a human within a given zone, the robot may communicate information regarding the detection of the human as well as the position of the detecting robot (and/or location of zone with respect to the location of the detecting robot). Further still, in some embodiments, directional information may be provided. For example, information regarding both the position and the direction of a movement of a mobile human may be communicated between other robots and/or other off-board sources. Thus, in some embodiments, information regarding humans not located within a field of view of an on-board visual recognition unit may be used to help alert a robot to an approaching human, to supplement information obtained from an on-board source, and/or to confirm or check information from an on-board source.

Returning to FIG. 1, the depicted manipulation unit 120 is configured to at least one of grasp items or provide an adjustable view for collection of information. For example, the manipulation unit 120 may include one or more arms, hinges, linkages, or other mechanisms to control the position of one or more grippers, holders, cameras, or other devices. In various embodiments, the manipulation unit 120 may include one or more motors, gears, cylinders, or the like to actuate a mechanism such as an arm based on control signals or commands provided by the processing unit 140. The manipulation unit 120 may be hydraulically, electrically, or otherwise actuated. For example, the manipulation unit 120 may be configured to grasp and manipulate an item, for example to release a brake, actuate a switch, secure (or release) a latch or fastener, position and hold a part or tool for use in maintenance and inspection of a rail car, load a part or tool to be transported on to the robot 100 (or off-load the tool or part from the robot 100), or the like. Alternatively or additionally, the manipulation unit 120 may be used to position a device used to collect information. For example, the manipulation unit 120 may position an inspection camera in a difficult to reach area (e.g., underneath a rail car), with information from the camera used for inspection or diagnostic purposes. The robot 100 may transmit information from an inspection camera positioned by the manipulation unit 120 to an off-board recipient for review and analysis of a portion of a rail car viewed by the inspection camera.

The visual recognition unit 130 of the illustrated embodiment is configured to acquire presence information (e.g., information describing, depicting, or otherwise corresponding to the presence of a human) within at least a portion of an area within which the robot 100 may travel. The visual recognition unit 130 includes at least one detector 132 configured to acquire presence information. The detector 132 may be a 2-D detector (e.g., 2-D camera) or a 3-D detector (e.g., RGBD camera, stereo camera, lidar detector). The visual recognition unit 130 may include more than one detector. The visual recognition unit 130 is depicted as a single block in FIG. 1, but may include portions or aspects mounted at different locations on the robot 100 and may include more than one physically distinct structures. For visual recognition units including more than one detectors, the detectors may be commonly mounted at a shared position, or may be mounted at different positions on the robot 100 (e.g., one detector mounted at a first position and one detector mounted at a second, different position). For example, one detector may be mounted to a mast or other structure dedicated to mounting and/or supporting the detector, while a different detector may be mounted to an arm of the manipulation unit 130. In the illustrated embodiment, the visual recognition unit 130 includes an adjustment unit 134 operably coupled to the detector 132 and configured to adjust the position, focus, and/or aim of the detector 132. For example, the adjustment unit 134 may provide pan-and-tilt capability to increase the effective field of view of the detector 132 and/or to provide for improved focus or study of an object of interest (e.g., a potential human) within a field of view of the detector 132.

In various embodiments, the detector may be used in conjunction with recognition software that determines presence of humans based on images or other information provided by the detector 132. The software may be stored on or used in connection with the processing unit 140. Alternatively or additionally, recognition software may be stored on or used in connection with a computer or processor forming a part of the visual recognition unit 130, with the presence of a detected human communicated from the visual recognition unit 130 to the processing unit 140. The recognition software may also be utilized to determine posture and/or movement of a person over time.

The field of view for a given detector of the visual recognition unit 130 may be the same as a zone (e.g., a buffer zone), or may be a portion of a zone (e.g., with one or more other detectors providing information on the rest of the zone, or with the detector panned, tilted, or otherwise moved to provide a larger effective field of view). In some embodiments, the field of view of a given detector may be larger than a zone (e.g., buffer zone). In addition to being used to determine if a human is present with one or more zones for use in determining control actions of the robot 100, information from one or more detectors of the visual recognition unit 130 may be used to determine if the robot is located in a confined space or not (e.g., to determine if the robot is located in the narrow area 240 or the open area 250). Further, information from a detector of the visual recognition unit (e.g., from a camera mounted on a manipulation arm) may also be used for diagnostic or inspection purposes of a portion of a railcar within a field of view of the detector.

In some embodiments, additional detectors (e.g., in addition to any cameras and/or lidar detectors of the visual recognition unit 130) may be disposed on and/or employed by the robot 100. For example, sonar and/or proximity sensors may be used to detect stationary objects such as walls, posts, or other structures, with the detector 132 (or detectors 132) of the visual recognition unit 130 used to identify humans.

It may be noted that in some embodiments, a given detector 132 may be dedicated to a particular sub-system or portion of the robot 100 (e.g., dedicated for use only with the navigation system 110 and/or in the navigation mode, dedicated for use only with the manipulation unit 120 and/or in the manipulation mode). In other embodiments, one or more detectors 132 of the visual recognition unit 134 may be shared among modes and/or subsystems or portions. For example, for a given mode or sub-system, a first detector may be a primary detector with a second detector used to supplement, confirm, or check information from the first detector. Optionally, the second detector may be a primary detector for a different mode or sub-system, with the first detector used as a supplemental detector for the different mode or sub-system. In some embodiments, a first detector may be utilized to provide a first field of view for one size zone, and a second detector used to provide a differently sized second field of view for differently sized zone.

The depicted processing unit 140 is configured to determine a presence of a human within at least one predetermined range (e.g., buffer zone, manipulation zone) of the robot 100 using presence information from the visual recognition unit 130. The presence information may include images or other representations of the environment of the robot 100 used by the processing unit 140 to determine if a human is present, or may include an indication from the visual recognition unit 130 that a human has been detected in a given zone and/or field of view. The processing unit 140 of the illustrated embodiment is also configured to determine at least one control action responsive to determining the presence of the human within the at least one predetermined range, and to control at least one of the navigation system 110 or the manipulation unit 120 to implement the at least one control action. For example, a pre-planned activity (e.g., an activity previously planned by the processing unit 140 or other source for performance by the robot 100) may be altered to account for the detection of a worker within a zone. For example, when a human is detected in a given zone, a previously planned activity by the robot may be stopped or otherwise modified to avoid the detected human. In some embodiments, for example, the processing unit 140 may receive and use information from a first detector to determine if a human is present in a buffer zone, and, if so, to determine a navigation control action to avoid the human. The processing unit 140 may receive and use information from a second detector to determine if a human is present in a manipulation zone, and, if so, to determine a manipulation control action to avoid the human. In other embodiments, information from two or more detectors may be used in connection with each other to determine a given control action.

The depicted processing unit 140 is operably coupled to the navigation system 110, the manipulation unit 120, the visual recognition unit 130, and the communication unit 140. The processing unit 140, for example, may receive information from the visual recognition unit 130 and/or communication unit 150 from which the processing unit 140 determines if a human is present and, if so, determine appropriate control actions to provide for the safety of the human (e.g., to stop or modify a given movement or action by the robot 100 to avoid contact with the human, or to stay beyond a certain distance of the human). The processing unit 140 may then provide a control signal or command to the navigation system 110 and/or the manipulation unit 120 to implement the determined appropriate control action or actions. The processing unit 140 may include processing circuitry configured to perform one or more tasks, functions, or steps discussed herein. It may be noted that "processing unit" as used herein is not intended to necessarily be limited to a single processor or computer. For example, the processing unit 140 may include multiple processors and/or computers, which may be integrated in a common housing or unit, or which may distributed among various units or housings.

Returning to FIG. 1, in the illustrated embodiment, the processing unit 140 includes an identification module 142, a determination module 144, a control module 146, and a memory 148. It may be noted that the particular units or modules shown in FIG. 1 are meant by way of example, and that other arrangements of units or sub-units of the processing unit 130 may be employed in various embodiments, and that other types, numbers, or combinations of modules may be employed in alternate embodiments, and/or various aspects of modules described herein may be utilized in connection with different modules additionally or alternatively. Generally, the various aspects of the processing unit 140 act individually or cooperatively with other aspects to perform one or more aspects of the methods, steps, or processes discussed herein.

The depicted identification module 142 receives or otherwise obtains presence information from the visual recognition unit 130 and identifies if a human is within one or more zones, such as buffer and/or manipulation zones. In some embodiments, the identification module 142 may obtain images or imaging information from one or more cameras and/or lidar detectors of the visual recognition unit 130. The identification module 142 may have software loaded thereon or otherwise have access to software that identifies humans from imaging information. In addition to the presence of the human, the location of the human within the field of view and/or zone of interest may be determined, as well as posture, for example. Further, by obtaining imaging information over time, movement of the human and/or trends in the movement of the human may be determined. Alternatively, in some embodiments, the visual recognition unit 130 may have human recognition software stored thereon or have access thereto, with the visual recognition unit 130 determining if a human is present in one or more images, and providing information to the identification module 142 describing the presence and location of any detected humans. The identification module 142 may then identify any zones of interest (e.g., buffer zones and/or manipulation zones) that have a human present.

The depicted determination module 144 receives or otherwise obtains information from the identification module 142 describing the presence of one or more humans in one or more zones of interest. The determination module 144 determines if a control plan of the robot 100 should be altered due to the presence of one or more humans, and determines the appropriate control actions to prevent the robot 100 from contacting the human. In some embodiments, the determination module 144 may determine what mode of operation (e.g., navigation mode or manipulation mode) the robot is currently in, and/or a location of the robot (e.g., within the narrow area 240 or the open area 250), and determine the control action (or actions) based at least in part on the mode of operation and/or location of the robot 100.

For example, in some embodiments, the determination module 144 (and/or other aspect of the processing unit 140) is configured to determine if the robot 100 is in the narrow area 240 or in the open area 250. The processing unit 140 (e.g., determination module 144) may then determine at least one control action using a first strategy if the robot 100 is in the narrow area 240, or to determine at least one control action (e.g., a different control action, such as a less restrictive or more permissive control action) using a second strategy if the robot 100 is in the open area 250. Thus, for example, in some embodiments, a more permissive and time saving avoidance strategy (e.g., a strategy in which the robot 100 keeps moving but modifies a direction or speed of movement to avoid the human) may be employed in open areas, while a more restrictive strategy (e.g., stopping the robot 100 until the human is out of the zone of interest) may be employed to ensure safety in tight quarters where an avoidance strategy may be overly risky or otherwise not practicable.

The processing unit 140 may employ a "stop and wait" strategy when the robot 100 is in the narrow area 240. For example, the processing unit 140 may control the navigation system 110 to maintain the robot 100 in a stationary position when the robot 100 is in the narrow area 240 and a human is detected within a buffer zone. On the other hand, the processing unit 140 may employ an "avoidance" strategy when the robot 100 is in the open area 250. For example, the processing unit 140 may control the navigation system 110 to avoid a human (e.g., slow down and/or steer to change direction) when the robot 100 is in the open area 250 and the human is detected within a buffer zone.

The processing unit 140 may also determine control actions for when the robot 100 is in the manipulation zone (e.g., the robot 100 is stationary and moving the manipulation unit 130 or about to commence movement of the manipulation unit 120). For example, the processing unit 140 may maintain the manipulation unit 120 in a stationary position when a human is detected within a manipulation zone. The manipulation zone may be defined or determined by the maximum range of an arm of the manipulation unit 120. For example, the workspace of an arm (either maximum workspace, or workspace required by a current manipulation operation) may define a danger zone. When all or a portion (e.g., arm) of the manipulation unit 120 is in motion, any human activity detected within the danger zone may result in the stoppage of the manipulation activity or task until the human is beyond the danger zone. On-board stereo cameras and/or lidar detectors of the visual recognition unit 130 may be used by the processing unit 140 to detect and estimate the position of any person within the field of view of the cameras and/or lidar detectors. The robot 100 may also include a flashing light and/or audible messages or alarms that are activated to indicate when the robot 100 and/or the manipulation unit 120 are in motion. In some embodiments, the lights, alarms, or messages may intensify in brightness, loudness, frequency or otherwise when a person approaches the danger zone closely but does not enter the danger zone. For example, a first alarm may be provided when the robot 100 is in motion, and a second, more intense alarm may be provided when the robot 100 is in motion and a human is near a buffer and/or manipulation zone. Further still, an additional alarm or message may be provided when the robot 100 has stopped either a navigation activity or a manipulation activity due to the presence of a human, thereby alerting the human and prompting the human to move outside of the zone of interest.

The control module 146 of the illustrated embodiment receives or otherwise obtains control information (e.g., one or more control actions determined by the determination module 144) from the determination module 144, formulates a control command or commands, and provides the control command or commands to the navigation system 110 and/or the manipulation unit 120 for implementation, as appropriate. The control command may be a command to stop or slow down, to steer in a new direction to avoid a human, to speed up (e.g., return to a previously planned speed when a human leaves a buffer zone), or the like. The control module 146 may also provide control commands pursuant to a pre-planned course of action when no human is detected in a zone of interest.

The communication unit 150 is configured to provide information from the robot 100 to other robots, a base, (e.g., base 210), or other off-board recipient, and to receive information from off-board sources such as other robots, a base, one or more stationary visual recognition units, or the like. For example, the communication unit 150 may communicate the presence and location of persons detected by the robot 100 to a base, central dispatch, or planning center, or to other robots, among others. Further, the communication unit 150 may receive information describing the position and/or motion (e.g., speed and direction) of persons detected via stationary visual recognition units and/or other robots. The communication unit 150 may include or be coupled to an antenna for transmitting and/or receiving messages.

Figure 3:
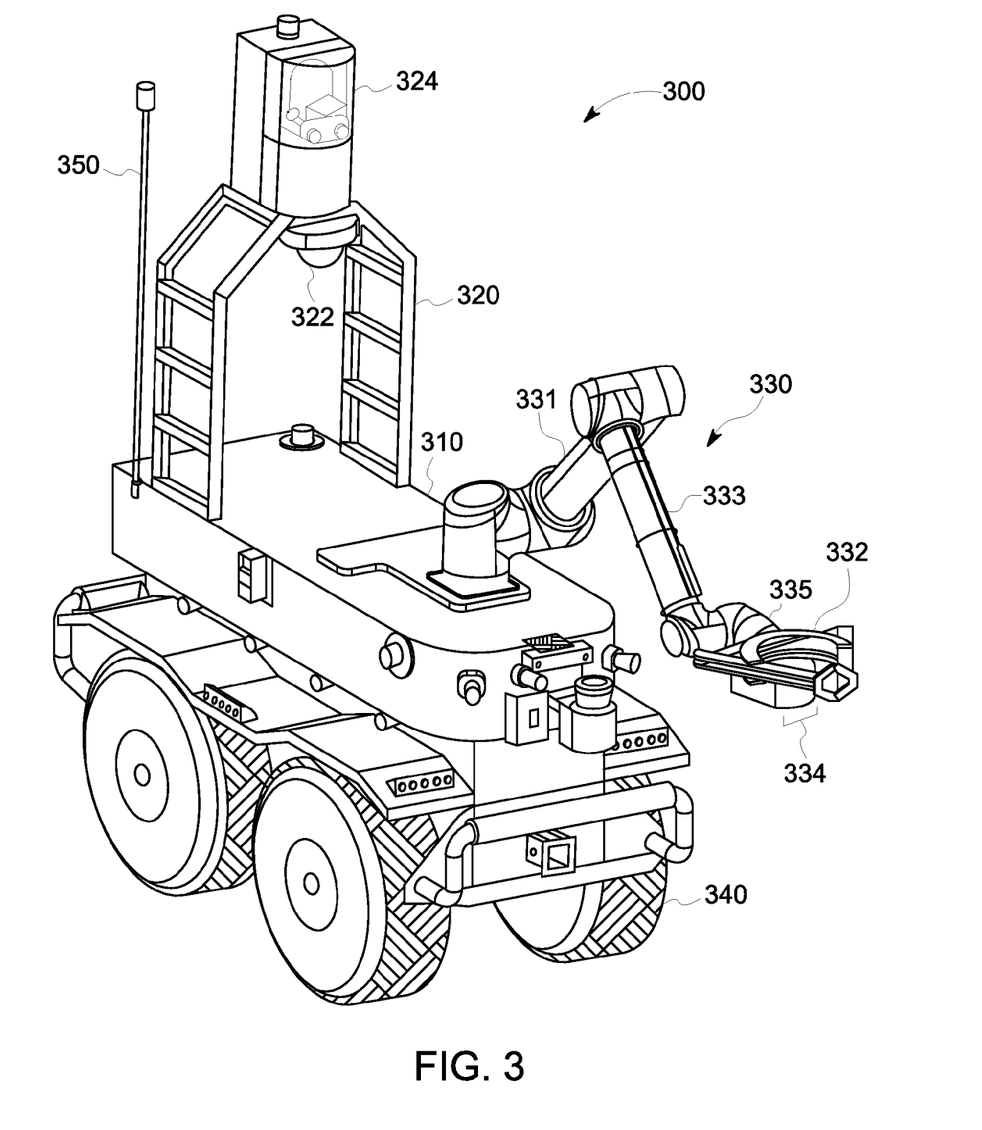
FIG. 3 is a perspective view of a rail yard robot in accordance with various embodiments.

FIG. 3 provides a perspective view of a robot 300 formed in accordance with various embodiments. The robot 300 may be configured for use as a rail yard robot. The robot 300 may include one or more aspects generally similar to the robot 100 discussed in connection with FIG. 1. The depicted robot 300 includes a body 310. The body 310, for example, may house one or more processors (e.g., one or more processors that form all or a portion of the processing unit 140). The body 310 may also provide for the mounting of other components and/or sub-systems.

In the illustrated embodiment, the robot 300 includes a mast 320 mounted to the body 310. The mast 320 is configured to provide a mounting of a first visual detector 324 (e.g., stereo camera or lidar detector) and adjustment unit 322 for the first visual detector 324. The field of view of the first visual detector 324 may be adjusted via the adjustment unit 322, which may include a motor or other device for moving the first visual detector 324 (e.g., to one or more of rotate, pan, or tilt the first visual detector).

The articulated arm 330 provides an example of a manipulation unit, and includes plural jointed sections 331, 333, 335 interposed between a gripper 332 and the body 310. The articulated arm 330 may be actuated to control the positioning and usage of the gripper 332, as well as the positioning of a second visual detector 334 (e.g., stereo camera or lidar detector). The gripper may be configured to one or more of grasp a brake lever for actuation, release, or testing of the brake; to manipulate a switch; to grasp and hold tools for use on a rail car and/or components for installation to or removal from the rail car; or the like. The first visual detector 324 and the second visual detector 334 provide examples of separately mounted detectors of a visual recognition unit. It may be noted that information from one or more detectors of the visual recognition unit may be used for further purposes or tasks in addition to detection of humans. For example, the second visual detector 334 may be used to provide a view of the surroundings of the gripper 332. For example, the second visual detector 334 may be utilized to provide a view of an underside of a rail car for inspection or diagnostic purposes.

The robot 300 includes wheels 340 that are configured to be driven by a motor and/or steered to move the robot 300 about an area (e.g., a rail yard) when the robot 300 is in a navigation mode. It may be noted that, additionally or alternatively, tracks, legs, or other mechanisms may be utilized to propel or move the robot 300. In the illustrated embodiment, the antenna 350 used to communicate with a base, stationary visual detectors, other robots, or the like.

Thus, in various embodiments, systems and/or methods are provided that improve rail yard safety, while still providing for efficient control of robots to perform inspection and/or maintenance tasks. Using visual information obtained via on-board and/or off-board systems, robots may be controlled to avoid contact with humans. The particular control strategies employed may be tailored for the mode of operation (e.g., navigation and/or manipulation) under which the robot is operating and/or an area (e.g., confined or open) in which the robot is located.

Figure 4:
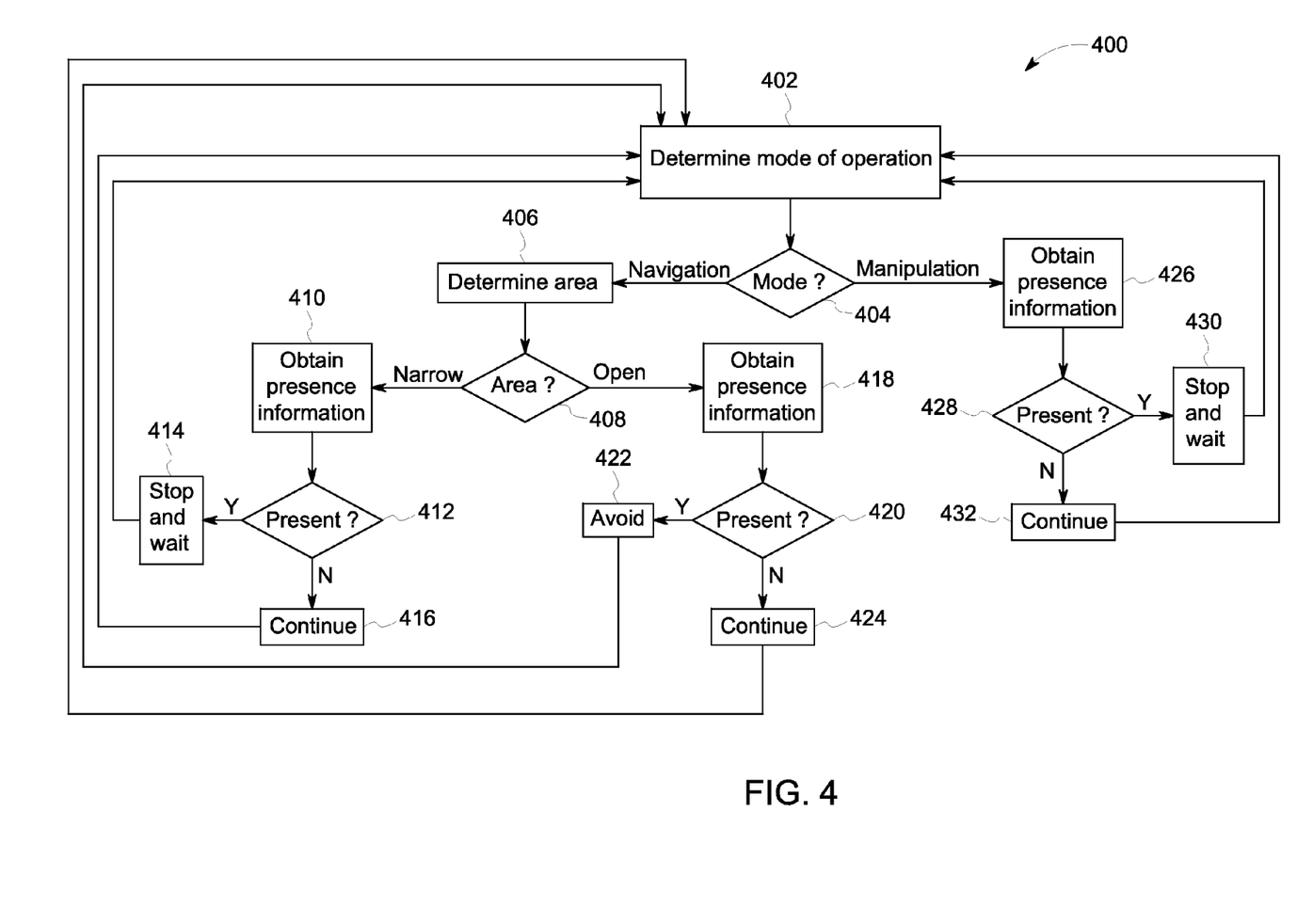
FIG. 4 is a flowchart of a method for controlling a rail yard robot in accordance with various embodiments.

FIG. 4 provides a flowchart of a method 400 for controlling a robot, for example a robot for use in a rail yard. In various embodiments, the method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware to perform operations described herein.

At 402, a mode of operation is determined. For example, one or more processors (e.g., processing unit 140) disposed on-board a robot may determine what process or task a robot is currently performing, or is about to perform. A robot that is travelling from one area to another, or about to commence such travel, may be understood as operating in a navigation mode. A robot that is performing a task with a manipulation arm and gripper, for example, or about to commence such performance of a task, may be understood as operating in a manipulation mode.

At 404, if the mode of operation is determined to be a navigation mode, the method 400 proceeds to 406. If the mode of operation is determined to be a manipulation mode, the method 400 proceeds to 426.

At 406, the area within which the robot is located is determined. For example, a rail yard in which the robot is configured to operate may have areas of different types. For instance, an area between parked trains or consists, or otherwise confined, may be identified as a narrow or confined area. Such areas may not provide sufficient room for a robot to maneuver around a human or other obstacle in the path of the robot (or in the path of a manipulation arm of the robot). Other areas may be more open and provide additional room for a robot to maneuver around a human or other obstacle. The determination of area may be based on one or more of visual information (e.g., collected by a camera or lidar), sonar information (e.g., used to locate walls or other structures), positioning information (e.g., information from a global positioning system based on-board the robot and compared to a predetermined map of identified locations), among others. Other types or classification of areas (or gradations between levels of narrowness or openness) may be used in various embodiments. For example, in some embodiments three areas may be utilized: an open area for which a first relatively permissive control strategy (e.g., maintain speed but steer to avoid human) is employed, a narrow area for which a second relatively restrictive control strategy (e.g., stop and wait until human is out of buffer zone) is employed, and an intermediate area for which an intermediate control strategy (e.g., slow down and steer to avoid human) is employed.

At 408, if the area is determined to be a narrow area, the method proceeds to 410. If the area is determined to be an open area the method proceeds to 418.

At 410, presence information is obtained, for example by one or more processors disposed on-board the robot. The presence information may correspond to one or more buffer zones corresponding to a desired distance to be maintained between a moving robot and any humans. The size of a buffer zone may be selected to provide sufficient time for a human to avoid a robot, or for a robot to stop and/or steer to avoid a detected human. The presence information is obtained from one or more visual detectors (e.g., detector 132, first visual detector 324, second visual detector 334), such as a camera or lidar detector. In various embodiments, the one or more visual detectors may be disposed on the robot and/or disposed off-board. In some embodiments, a particular visual detector may be dedicated for use in providing visual information used in conjunction with a particular mode (e.g., navigation, manipulation). The presence information may be in the form of images or imaging information from which on-board processors may determine if a human is present (e.g., using human recognition software), or, in some embodiments, may include a message describing the position, motion, and/or posture of any humans located within a field of view and/or a zone of interest (e.g., buffer zone).

At 412, if it is determined that a human is present (e.g., within a buffer zone surrounding at least a portion of the robot), the method 400 proceeds to 414. If it is determined that no human is present in the buffer zone, the method 400 proceeds to 416.

At 414, with a human in the buffer zone and the robot in a narrow area, the robot is controlled to stop and wait until the human has left the buffer zone. An alarm or other message may be provided by the robot to alert the human that the robot has stopped due to the presence of the human, and/or to prompt or request the human to move an additional distance away from the robot. Additional presence information may be obtained at subsequent times from visual detectors to monitor the presence of the human in an ongoing fashion.

At 416, with no human in the buffer zone, the robot may continue any current or planned traversal across the area. As shown in FIG. 4, in the illustrated embodiment, as long as the robot is operational, the method 400 may continue to monitor the mode and location of the robot as well as the presence of any humans. It may be noted that the order or arrangement of steps may vary in different embodiments. In various embodiments, for example, the method 400 may continue after 414 and/or 416 by proceeding to 406 or 410 instead of 402 in certain circumstances. When the robot is at rest or not in the rail yard, the monitoring of mode, location, or the like may be put into a hold or stand-by mode, and resumed when the robot resumes operation.

At 418, with the robot determined to be operating in navigation mode in an open area, presence information is obtained, generally similar to the obtaining of presence information at 410. For example, imaging information corresponding to the presence or absence of humans within a buffer zone may be obtained from one or more visual detectors (e.g., on-board visual detectors).

At 420, if a human is determined to be present within the buffer zone, the method 400 proceeds to 422. If a human is determined not to be present within the buffer zone, the method 400 proceeds to 424.

At 422, with a human in the buffer zone and the robot in an open area, the robot is controlled to continue moving but to alter a previously planned course of travel to avoid the human. For example, the robot may steer to a new direction to avoid the human, and continue monitoring the presence of the human to confirm that the new path will avoid the human (and to modify the new path to avoid the human if not). An alarm or other message may be provided by the robot to alert the human that the robot is travelling near the human, and/or to prompt or advise the human to the newly planned course to be taken by the robot. Additional presence information may be obtained at subsequent times from visual detectors to monitor the presence of the human in an ongoing fashion.

At 424, with no human in the buffer zone, the robot may continue any current or planned traversal across the area.

At 426, with the robot determined to be in the manipulation mode, presence information is obtained, for example by one or more processors disposed on-board the robot. The presence information may correspond to a manipulation zone corresponding to a range of a manipulation arm. For example, the manipulation zone may be generally circular and have a radius corresponding to a maximum reach of a manipulation arm (e.g., the radius of the manipulation arm plus a safety factor). As another example, the manipulation zone may be defined only in a direction or directions of planned travel of the manipulation arm, so that the manipulation zone only includes areas that may be in the path of the manipulation arm. The presence information is obtained from one or more visual detectors (e.g., detector 132, first visual detector 324, second visual detector 334), such as a camera or lidar detector. In various embodiments, the one or more visual detectors may be disposed on-board the robot and/or disposed off-board the robot. In some embodiments, a particular visual detector may be dedicated for use in providing visual information used in conjunction with a particular mode (e.g., navigation, manipulation). The presence information may be in the form of images or imaging information from which on-board processors may determine if a human is present (e.g., using human recognition software), or, in some embodiments, may include a message describing the position, motion, and/or posture of any humans located within a field of view and/or a zone of interest (e.g., manipulation zone).

At 428, it is determined if any humans are present within the manipulation zone. If a human is present in the manipulation zone, the method 400 proceeds to 430, but if no human is determined present in the manipulation zone, the method 400 proceeds to 432.

At 430, a current or upcoming motion of the manipulation arm is paused or stopped due to the presence of a human in the manipulation zone. Presence information may be acquired and analyzed over time to monitor the presence of the human, and the motion of the manipulation arm may resume when the human is no longer in the manipulation zone. In other embodiments, the manipulation arm may be slowed and/or steered to avoid a human, for example, based on a determined position, posture, and speed of the human, with the position, posture, and speed monitored on an ongoing basis to adjust the path and/or speed of the manipulation arm as appropriate. At 432, with no human in the manipulation zone, the robot may continue any current or planned movement of the manipulation arm.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A robot for use in a rail yard, the robot comprising:
    a navigation system configured to move the robot about an area;
    a manipulation unit configured to at least one of grasp items or provide an adjustable view for collection of information;
    a visual recognition unit comprising at least one detector configured to acquire presence information within at least a portion of the area; and
    a processing unit operably coupled to the navigation system, manipulation unit, and visual recognition unit, the processing unit configured to:
        determine a presence of a human within at least one predetermined range of the robot using the presence information from the visual recognition unit;
        determine at least one control action responsive to determining the presence of the human within the at least one predetermined range; and
        control at least one of the navigation system or manipulation unit to implement the at least one control action.

2. The robot of claim 1, wherein the visual recognition unit comprises a camera mounted on an adjustment unit, the adjustment unit configured to at least one of pan or tilt the camera.

3. The robot of claim 1, wherein the visual recognition unit comprises at least a first detector and a second detector, wherein the processing unit is configured to determine a navigation control action using information from the first detector and to determine a manipulation control action using information from the second detector.

4. The robot of claim 1, wherein the processing unit is configured to determine if the robot is in a narrow portion of the area or an open portion of the area, and to determine the at least one control action using a first strategy if the robot is in the narrow portion and to determine the at least one control action using a second strategy if the robot is in the open portion.

5. The robot of claim 4, wherein the processing unit is configured to control the navigation system to maintain the robot in a stationary position when the robot is in the narrow portion and a human is detected within a buffer zone.

6. The robot of claim 4, wherein the processing unit is configured to control the navigation system to avoid a human when the robot is in the open portion and the human is detected within a buffer zone.

7. The robot of claim 1, wherein the processing unit is configured to maintain the manipulation unit in a stationary position when a human is detected within a manipulation zone.

8. The robot of claim 1, wherein the visual recognition unit comprises a lidar detector.

9. The robot of claim 1, wherein the visual recognition unit comprises stereo cameras.

10. A method for controlling a rail yard robot within an area, the method comprising:
    obtaining presence information within at least a portion of the area using a visual recognition unit;
    determining a presence of a human within at least one predetermined range of the robot using the presence information;
    determining at least one control action for the robot responsive to the determination of the presence of the human; and
    controlling at least one of a navigation system or manipulation unit of the robot using the at least one control action.

11. The method of claim 10, further comprising determining if the robot is within a narrow portion or an open portion of the area, wherein determining the at least one control action comprises using a first strategy to determine the at least one control action if the robot is in the narrow portion and using a second strategy to determine the at least one control action if the robot is in the open portion.

12. The method of claim 11, further comprising controlling the navigation system to maintain the robot in a stationary position when the robot is in the narrow portion and a human is detected within a buffer zone.

13. The method of claim 11, further comprising controlling the navigation system to avoid a human when the robot is in the open portion and the human is detected within a buffer zone.

14. The method of claim 10, further comprising determining if the robot is operating in a navigation mode or a manipulation mode.

15. The method of claim 10, further comprising using information from a first detector for determining, navigation control actions and using information from a second detector for determining manipulation control actions.

16. The method of claim 10, further comprising controlling, the manipulation unit to maintain the manipulation unit in a stationary position when a human is detected within a manipulation zone.

17. The method of claim 10, wherein the visual recognition unit comprises a lidar detector.

18. The method of claim 10, wherein the visual recognition unit comprises stereo cameras.

19. A tangible and non-transitory computer readable medium comprising one or more computer software modules configured to direct one or more processors to:
    obtain presence information within at least a portion of a rail yard area using a visual recognition unit;

determine a presence of a human within at least one predetermined range of a rail yard robot using the presence information;

determine at least one control action for the robot responsive to the determination of the presence of the human; and control at least one of a navigation system or manipulation unit of the robot using the at least one control action.

20. The computer readable medium of claim 19, wherein the visual recognition unit comprises a lidar detector and/or stereo cameras.

* * * * *